Dec. 2, 1958 R. LUCIEN 2,862,581
DISC BRAKE FOR VEHICLE WHEEL
Filed Jan. 5, 1956 4 Sheets-Sheet 1
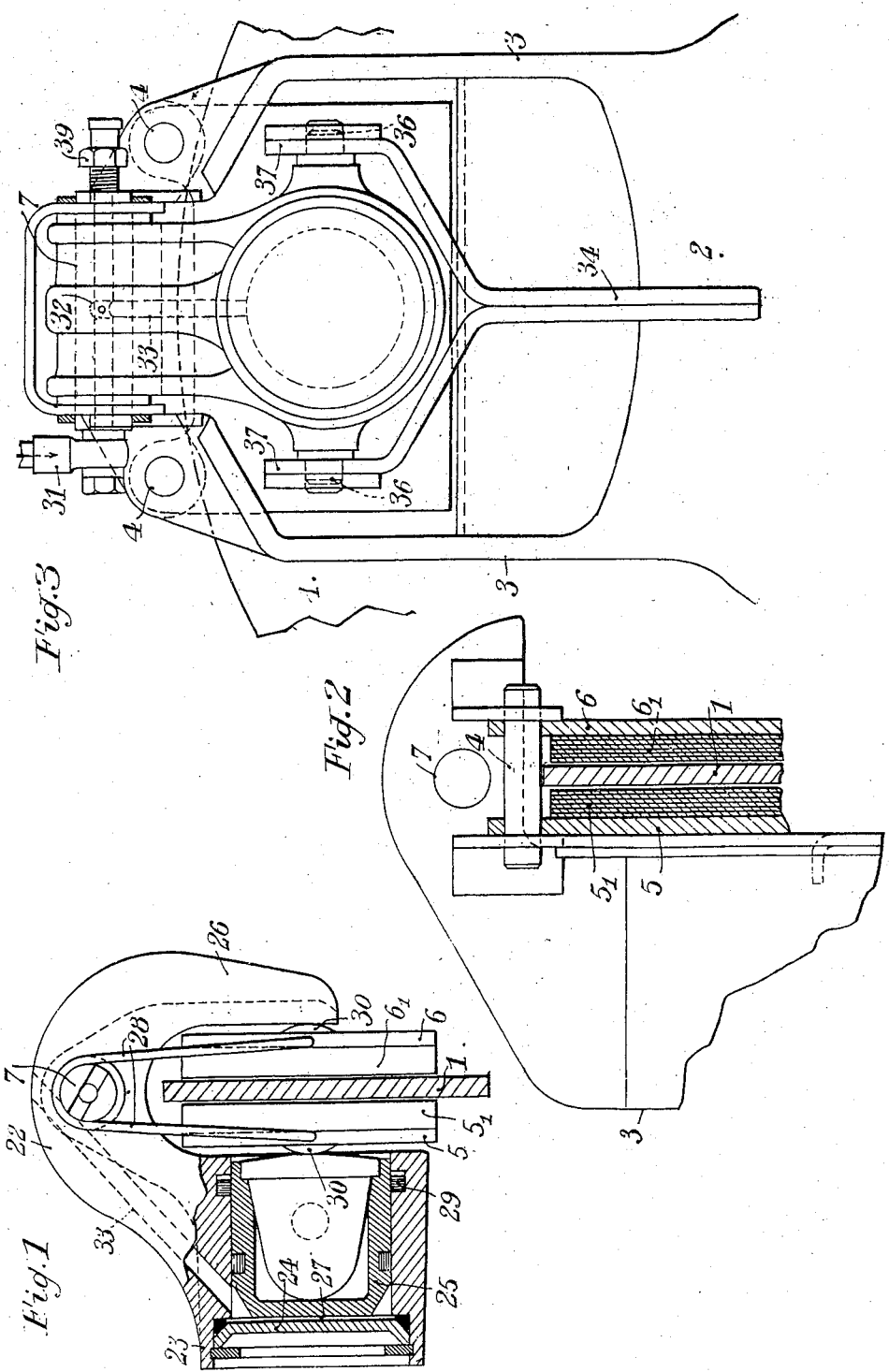

Dec. 2, 1958　　　　　　　R. LUCIEN　　　　　　2,862,581
DISC BRAKE FOR VEHICLE WHEEL
Filed Jan. 5, 1956　　　　　　　　　　　　4 Sheets-Sheet 2
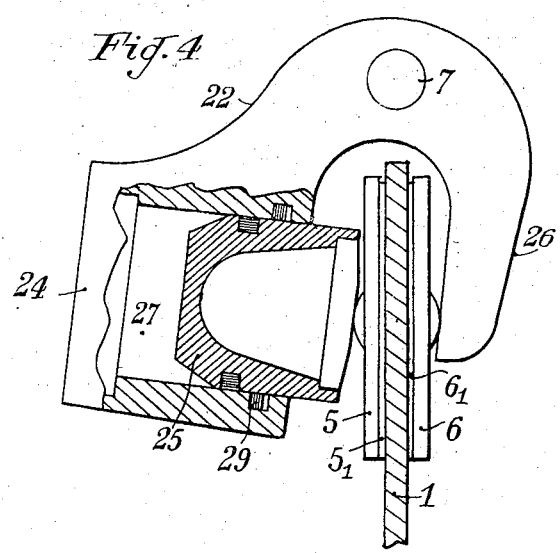
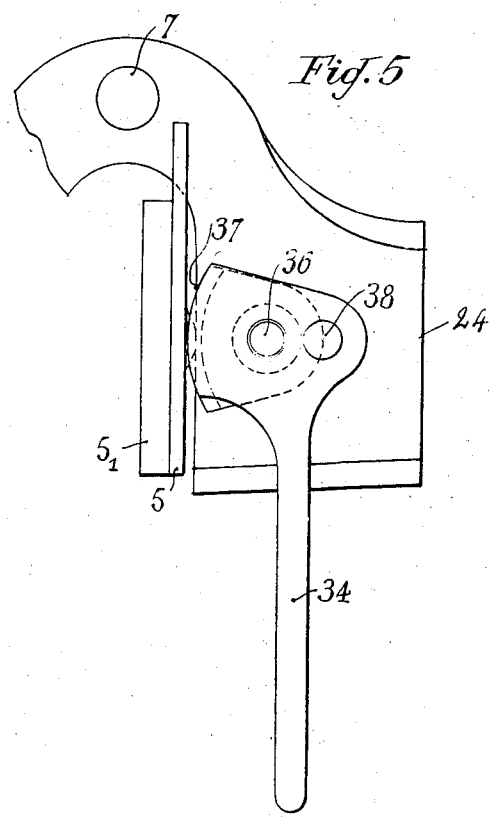

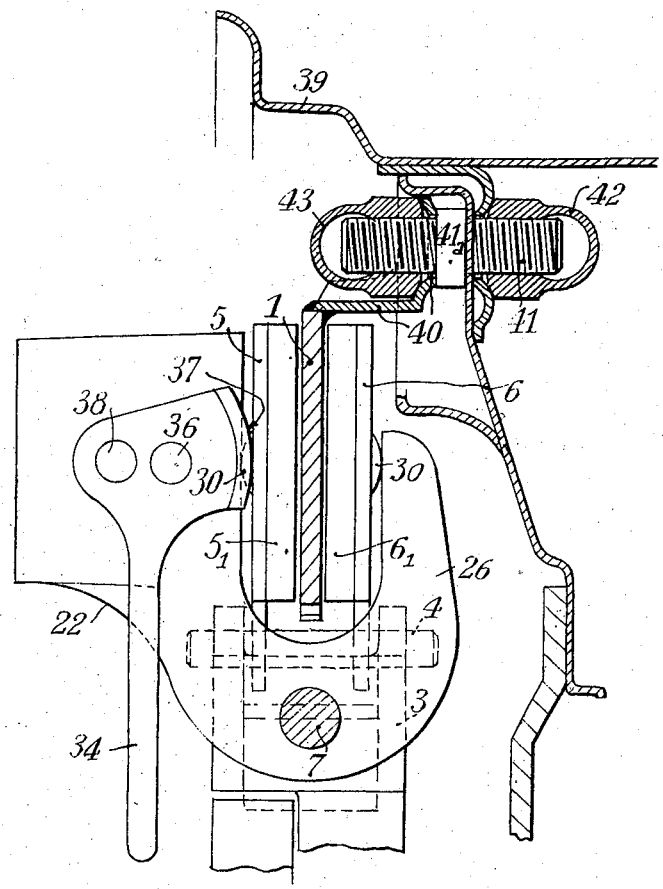

United States Patent Office 2,862,581
Patented Dec. 2, 1958

2,862,581

DISC BRAKE FOR VEHICLE WHEEL

Rene Lucien, Neuilly sur Seine, France

Application January 5, 1956, Serial No. 557,621

Claims priority, application France September 26, 1955

8 Claims. (Cl. 188—73)

This invention relates to vehicle brakes.

In my Patent No. 2,781,106, there has been described a brake for a vehicle wheel which is characterized in that on a support fixed with respect to the vehicle are mounted one or more braking units, each constituted by two members adapted to oscillate on a spindle rigidly fixed to the support; one of these members carries a jack responsive to fluid under pressure, while the other is shaped in the form of a U, the two branches of which enclose respectively the jack and brake segments movable in directions parallel to the axis of the wheel, and disposed on each side of a disc which is fixed to the wheel in such manner that an extension of the jack applies it on one side against one of the said segments and on the other side against one of the limbs of the U-shaped member, thus causing a pivotal movement of this member and, in consequence, the application of its other limb against the other brake segment.

The present invention has as an object the providing of an improved form of a disc brake of the above kind, which possesses a special feature in that the actuating jack forms an integral part of one of the limbs of the U-shaped member, the construction of the brake being thereby appreciably simplified.

Further and secondary features of the improved brake will be seen in the description which follows as illustrated in the attached drawings.

In these drawings:

Fig. 1 is a sectional view illustrating the essential parts of the brake;

Fig. 2 is a similar view, in cross-section, showing the assembly of the brake segments with their linings;

Fig. 3 is an end view of the brake;

Figure 6:
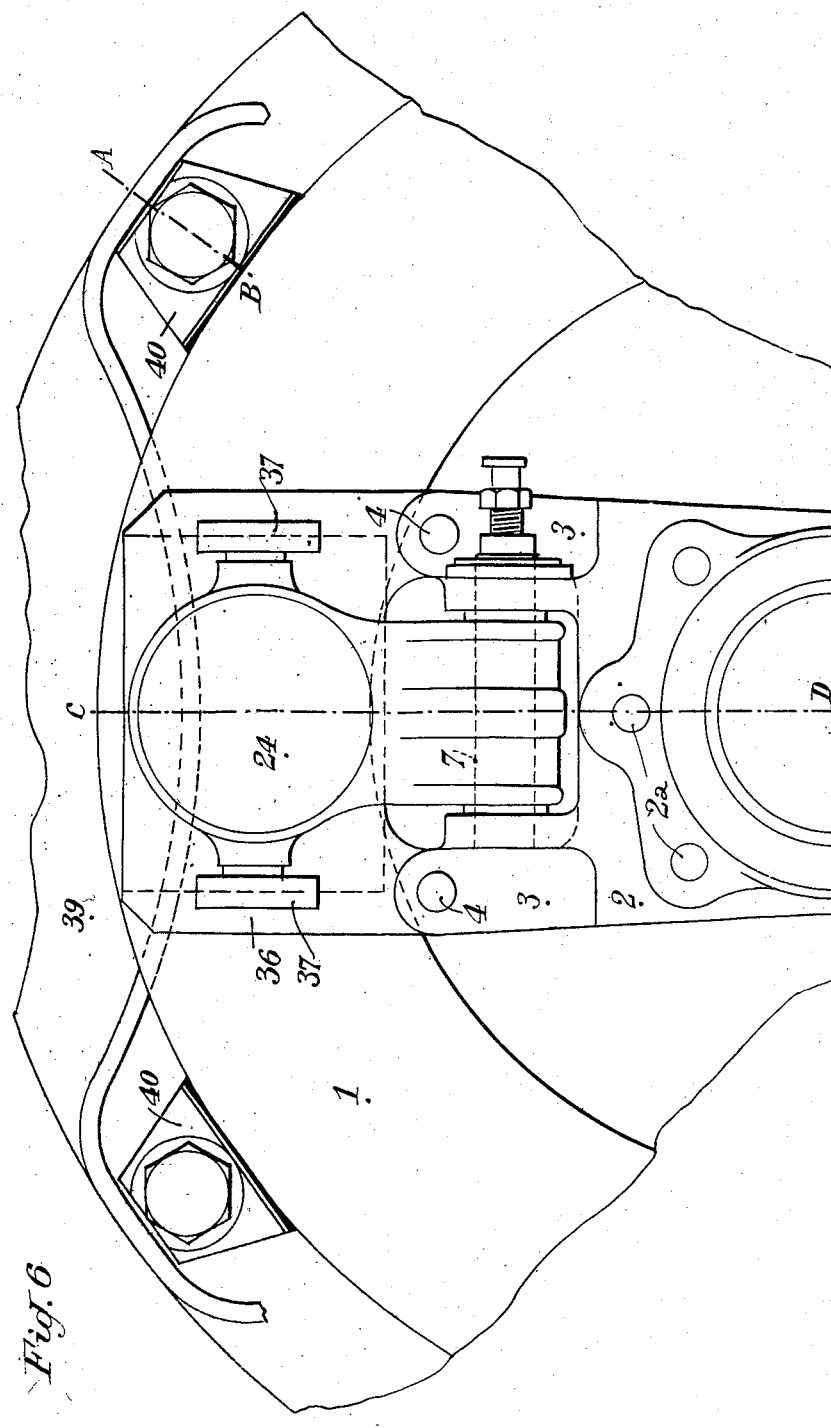

Fig. 4 corresponds to Fig. 1 but illustrates substantial wear on the brake linings;

Fig. 5 shows an emergency mechanical operating system;

Fig. 6 is an end view of an alternative form of the brake;

Fig. 7 is a sectional view along lines A—B and C—D of Fig. 6.

In Figs. 1 to 5, 1 represents a brake disc which is fixed for rotation with the wheel; 2 is a support which is fixed with respect to the vehicle; 3—3 is a forked member integral with the support, and the extremities of which are provided, in addition to the disc 1, with two rods 4—4 parallel to the axis of the associated wheel (not shown) and on which are threaded two brake segments constituted by metal sheets 5 and 6 which are adapted to slide on each side of the disc 1, and on which are fixed the friction linings $5_1$ and $6_1$, this system enables the linings to be rapidly replaced. The forked member 3—3 carries a spindle 7.

In accordance with the present invention, on spindle 7 is adapted to oscillate a stirrup including sections 22—26 in the shape of a U, which consitutes the only oscillating member of the braking unit. In Fig. 1 the limb 22 of the stirrup is provided with a cylinder 23 closed by a base 24, and in which is adapted to move a piston 25 which is supported on the brake segment 5—$5_1$. The other limb 26 of the stirrup forms a jaw which is supported on the other brake segment 6—$6_1$.

When fluid under pressure is forced into the space 27, the piston 25 is pushed towards the right-hand side of Fig. 1 and presses against the segment 5—$5_1$, while the base of the cylinder 24 is forced towards the left-hand side, thus producing a pivotal movement of the stirrup about the fixed axis or spindle 7, so that the extremity of the limb 26 comes into contact with the segment 6—$6_1$. The brake disc 1 is thus gripped between the limbs of the stirrup, or more precisely between the friction linings $5_1$—$6_1$.

The friction linings are normally held away from the disc 1 by means of steel wire springs 28—28, in order to avoid any residual braking effect. In opposition to the action of these springs, the return movement of the linings is however limited by a ring 29 in the form of a segment which is housed in a groove formed in the limb 22 and bears with considerable friction on the piston 25. In this groove, the ring is given a slight play parallel to the axis, which fixes the maximum play between the linings $5_1$—$6_1$ and the disc 1.

In order that the two linings may be constantly pressed during braking by forces which act approximately at their mid-points, the sheet steel members 5 and 6 are each provided with a boss 30 formed for example, by stamping.

The supply of the fluid under pressure is effected from the supply pipe 31, through the intermediary of the spindle 7 which is hollow for that purpose and is perforated at the level of a groove 32 formed either in the bore into which the spindle is fitted, or on the spindle 7 itself. A conduit 33 (see Figs. 1 and 3) which leads to the space 27 between the piston and the cylinder opens into this groove. The extremity of the spindle 7 opposite to the pipe 31 is closed by a drainage screw 39.

The brake is provided with an emergency mechanical control which is constituted by a crank-arm 34 (see Figs. 3 and 5) terminating in a forked member which pivots about a shaft 36 rigidly coupled to the limb 22 of the stirrup. This forked member is provided with cams 37 which, during operation, press the segment 5—$5_1$ against the disc 1. At the same time, due to reaction against the shaft 36, the stirrup pivots about the spindle 7 so that the limb 26 also presses against the lining 6—$6_1$, the disc 1 thus being gripped in a manner similar to the action of the hydraulic control.

In order to compensate for wear on the linings 5—$5_1$, the crank-arm 34 can be provided with one or a number of holes 38, by means of which it is possible to move the cams 37 closer to the friction lining 5—$5_1$ when wear takes place; the operation of inserting the shaft of the crank-arm into these supplementary holes is made possible by a transverse elasticity which is given to the two arms of the fork of the crank-arm.

In the above description, it is implicit that the disc 1 is fixed to the hub of the wheel, since the stirrup is on the outer side of this disc. The same assembly can also be provided in the case in which the brake disc is fixed to the rim of the wheel, the stirrup then being located on the inner side.

A construction of this kind is shown in Figs. 6 and 7. In these figures, the members in common with Figs. 1 to 5 have been given the same reference numbers.

In this embodiment, it will be seen that the stirrup 22—26 is arranged on the side of the shaft of the wheel with respect to the disc 1. The spindle 7 about which it oscillates, is carried by the support 2, which is fixed rigidly to the vehicle by means of bolts which pass through the holes 2a. The brake segments 5—6 can slide on the rods 4, as in the previous case.

The admission of the fluid under pressure to the cylinder carried by the limb of the stirrup is also effected in the same way through the spindle 7.

The brake disc 1 is rigidly to the rim 39 of the wheel in the following way: on the periphery of the disc 1 is welded, at intervals, the edge of one web of an angle-iron 40 which is sufficiently thin to bend when the disc 1 expands in its plane under the effect of the heat developed by the friction of the brake linings $5_1$—$6_1$, but which, on the other hand, is wide enough to withstand the friction torque developed by the braking action. The vertical web of the angle-iron 40 is pierced with a hole through which is passed a threaded rod 41 having a central shouldered portion 41a. A nut 42 fixes the threaded rod to the wheel and a further nut 43 fixes the vertical web of the angle-iron to the threaded rod by locking it against the shoulder 41a. In order to obtain a perfect centering of the disc 1, the edge of the hole in the angle-iron is punched-in in the direction of the shoulder 41 in order to present an inwardly curved surface to the nut 43. The nut 43 is of the type in which the contact surface is domed, so that when it is tightened the angle-iron is centered on the axis of the threaded rod and cannot thereafter be displaced out of center. The threaded rod is centered on the wheel in the same way. This embodiment includes, as in the case of that shown in Figs. 1 to 5, an emergency mechanical control identical with that which has already been described.

Finally, it will be understood that in all cases the brake may comprise a number of brake stirrups spaced apart on a circle.

I claim:

1. A disc brake for vehicle wheels comprising: a brake disc fixed for rotation with the wheel in a plane perpendicular to the axis of said wheel; a support to be fixed with respect to the vehicle; a spindle on said support perpendicular to the axis of said disc; at least one braking unit mounted on said support comprising a stirrup pivoted on said spindle and having spaced limbs positioned on either side of said disc; an operating jack forming an integral part of one of the limbs of said stirrup; two rods mounted on said support and perpendicular to said brake disc; and brake segments slidable on said rods and mounted between said jack and the other limb of the stirrup on either side of said disc, and movable with a translatory motion on said rods, while remaining parallel to said disc and fixed by said rods against rotation with said disc.

2. A disc brake according to claim 1 comprising an emergency mechanical control including a shaft mounted on one of said limbs, a crank arm pivotally mounted on said shaft; at least one cam on said crank arm to act on one of the brake segments, the other limb of the stirrup by reaction on said shaft acting on the opposite segment.

3. A disc brake according to claim 1 comprising springs fixed relative to said support for urging the brake segments to an inactive position.

4. A disc brake according to claim 1, wherein said jack includes a cooperating cylinder and piston, comprising a ring frictionally bearing on the piston of the jack to resist movement thereof.

5. A disc brake according to claim 1, wherein said spindle defines a bore for the supply of fluid under pressure to said jack.

6. A disc brake according to claim 1, in which the brake disc is fixed to the hub of the wheel, and the stirrup is on the exterior of said disc.

7. A disc brake according to claim 1, in which the brake disc is fixed to the rim of the wheel and the stirrup is arranged on the side of the wheel shaft.

8. A disc brake according to claim 1, in which the stirrup is arranged on the side of the wheel shaft, the brake disc being fixed to the rim of the wheel, comprising angle-irons having a flexible web welded to their periphery for connecting the disc to the rim, a further web defining a hole with an inwardly directed periphery, a threaded rod passing through said hole and rigidly fixed to the wheel, and a unit with a domed contact face, the further web being locked in position on said rod by said unit.

References Cited in the file of this patent

UNITED STATES PATENTS

| 2,655,229 | Eksergian | Oct. 13, 1953 |
| 2,746,254 | Lucien | May 22, 1956 |

FOREIGN PATENTS

| 703,860 | Great Britain | Feb. 10, 1954 |